3,131,053
PRODUCTION OF METALLIC IRON AND
SILICATE GLASS
John J. Grebe and John F. Miller, Midland, Mich., assignors to The Dow Chemical Company, Midland, Mich., a corporation of Delaware
No Drawing. Filed May 22, 1961, Ser. No. 120,832
16 Claims. (Cl. 75—30)

The invention is concerned with the production of a metallic iron product low in sulfur, phosphorus, and silicon and a useful silicate glass-like co-product from a material containing compounds of iron and silicon.

The present application is a continuation-in-part of application Serial No. 823,026, filed June 26, 1959, now abandoned.

Generally, conventional methods of iron production comprise subjecting a mixture of an iron ore, a high grade carbon and limestone to the action of a blast of air or oxygen in a blast furnace whereby the metal and oxides of carbon are formed along with large quantities of a calcium silicate slag. Since only a small portion of this slag is now used for any purpose, it has, generally speaking, no commercial value and presents a problem of disposal.

The quantity of limestone used in conventional iron ore smelting is large. Although limestone is relatively abundant, it is a natural product and limestone quarries which are located in places convenient to the smelting industry become depleted and new quarries must be opened up, often at a considerably greater distance from the smelters. It is conceivable that the amount of available limestone of acceptable quality may at some time in the future be limited. Furthermore, limestone is a bulky material which entails considerable costs to quarry, crush, and transport. These costs, together with labor and shipping problems, constitute a problem of considerable magnitude in the reduction of iron ore to produce metallic iron.

In addition, conventional methods of reducing iron ore to an iron having general utility require a number of process steps subsequent to the smelting or reduction of the ore.

It is a principal object of the invention to provide an improved method of reducing a native iron ore or iron containing raw material which has nominal impurity concentrations about the same as that found in such iron ores to yield an improved cast iron or steel. Another object of the invention is to provide a method of producing a useful vitreous silicate glass-like slag co-product incidental to the reduction of an iron-containing material in the production of iron. A further object is to provide a method of producing metallic iron and a useful glass-like slag from siliceous iron-containing materials including those of low iron content and those of relatively high sulfur content. A still further object is to provide a method of reducing iron compounds which does not require a high grade carbon and which consumes less carbon per pound of iron produced than do present methods. Another object is to reduce iron ore to low silicon-, phosphorus-, and sulfur-containing iron by a process involving less time and fewer steps than employed in known methods. Another object is to provide a useful glass-like slag which is substantially free from iron oxide and which slag is indigestible in aqueous sulfuric acid solutions, e.g., those containing from about 5 to about 15 percent by weight $H_2SO_4$.

These and other objects and advantages will be apparent from the detailed description presented hereinafter.

The invention consists in heating a mixture of a reducible iron-containing material, e.g., an iron ore, associated with siliceous material, e.g. $SiO_2$, gangue; a carbonaceous substance, i.e., one containing a substantial percent of fixed carbon, e.g., coal; and a compound selected from the group consisting of the hydroxides, oxides, and carbonates of the alkali metals to a temperature at least sufficient to render molten the iron and glass-like slag which form in the ensuing reaction. The molten metal may be separated from the slag in a known manner.

Preferably the temperature of reaction will be from about 1250° to about 1500° C. The upper temperature limit is not critical, but higher temperatures usually are not employed since no added benefits are apparent at higher reaction temperatures. Reaction time, i.e., the time interval in which the mixture is at reaction temperature, is usually between 10 and 40 minutes although a lesser or greater time may be employed.

The starting material for the iron can be any iron ore or iron containing material which contains at least 3.5 percent iron and which is capable of yielding metallic iron upon reduction but is limited to those materials wherein the inorganic impurity content, exclusive of silica, alumina and lime, at maximum concentration is about the same as for the various grades of native iron ores.

The compositions of typical iron ores are presented in Iron Ore, published by American Iron Ore Association, Cleveland, Ohio (1958), and "Iron Ores Analyses and Data 1959," published by the M. A. Hanna Company, Agent, Cleveland. The nominal approximate concentrations of impurities present in iron ores as set forth in these reference works are as follows: Phosphorus—.006–1%, silica—2–20% (in siliceous type ores silica may be as high as 45% or more), manganese—0.05–14%, aluminum—0.3–8%, lime—0.03–4%, magnesium—0.06–4% (in magniferous ore magnesium can go as high as 7.5%) and sulfur—0.002–0.45%. All values are expressed as the corresponding metal or non-metal oxide. Additionally, for the present process there is to be intermixed or combined with the iron source a silicon compound capable of yielding at least 2% $SiO_2$. Examples of iron and silica source materials suitable for use in the method, including those in the aforementioned publications, are the native iron ores, e.g., hematite, taconite, magnetite, siderite, pyrite, marcasite, pyrrhotite, limonite, and martite; siliceous, ferriferous cherts and shale; and, coal ash, fly ash or furnace slag.

Ores or iron containing materials which have considerable quantities of aluminum oxide are especially desirable for those applications where the glass-like slag product of the invention is to be used as a charge material in the process of making conventional soda-lime glass as such slag is easily miscible with the conventional glass making ingredients to supply additional alumina and silica and overcomes the usual difficulty of conventionally introducing alumina into the glass batch.

The carbon required for the reduction may be provided by any carbonaceous material which contains an appreciable percent of fixed carbon and which is capable of reducing the iron source material to metallic iron. A cheap grade of soft coal including lignite is fully satisfactory. High ash bituminous coal is usually employed because of its abundance and relatively low cost.

Although the hydroxide, oxide, or carbonate of any alkali metal, e.g., sodium, potassium and lithium is employed in the practice of the invention, the presence of a limited amount of other metal oxides, hydroxides or carbonates which are non-reducible under the present reaction conditions and which form a substantially homogeneous fused mass with $SiO_2$ at the temperature of the reaction is not objectionable. Examples of particularly useful materials are the oxides, hydroxides and carbonates of calcium and magnesium. To illustrate, calcium oxide in amounts up to about 25 percent by weight, based on the total combined weights of the alkali metal oxides, can be added to the mix. This addition is advantageous in that the CaO markedly reduces the volatilization losses of the alkali metal compound which may otherwise occur during operation of the process. For those applications where it is desired that $Al_2O_3$ be present in the glass and when this oxide is not provided by the iron- and silicon-containing compounds in the amount desired, additional quantities of alumina may be added directly to the mix.

Metals for alloying with iron, e.g., nickel, chromium, and manganese may be added, either in their metallic state or in a reducible oxidized form, to the iron and silicon materials or to the reaction mixture, if desired. Any metal capable of alloying with iron and having an oxide reducible in the reaction mixture at the temperature of the reaction may be employed, if desired, as an alloying metal.

In practicing the invention, carbonaceous material is admixed with the iron containing raw material, the iron values of which may be expressed as weight percent $Fe_2O_3$, in proportions such as to provide in the mixture fixed carbon in a mole ratio of between 0.50 and 4½ moles of carbon per mole of $Fe_2O_3$. The preferred mole ratio is from about 1½ to 3 because within this range the carbon is used more efficiently and there is no indication of incomplete reduction of the iron oxides present.

For the production of clear, lightly colored, green-to-blue homogeneous, vitreous glass-like slag there is usually required an amount of the total non-reducible metal oxide, hydroxide or carbonate (i.e., of alkali metal alone or of both alkali metal and alkaline earth metal) to provide the equivalent of from 0.5 to 1.5 moles of $Na_2O$ per mole of $SiO_2$ in the charge materials. However, the glass-like slag product may be produced by employing the foregoing mole ratio in the range of 0.25 to 4. For example, expressed in total mole percent of the mole equivalents of alkali metal oxide in the mixture, the $Na_2O$ may range from about 20 to about 80 percent.

Glass, or glass-like slag, produced for example from either furnace slag or common iron ores according to the process of the invention is usually high in $Al_2O_3$ and low in CaO, both conditions being specific requirements as an intermediate product for the production of container-type, sometimes called amber glass. The high $Na_2O$ content of the product of the method imparts low melting characteristics to the mixture of fused oxides containing $SiO_2$ and $Al_2O_3$ which is highly desirable especially in the subsequent use thereof to make additional glass where it is desirable to hold the glass molten at temperatures as low as 1100° C. despite the presence of the relatively high melting $Al_2O_3$. For example, a ternary glass consisting of 1 mole $Na_2O$, 2 moles of $SiO_2$ and 1 mole of $Al_2O_3$, which is about 35 percent by weight of $Al_2O_3$, has a melting point of 1089° C.

The glass product of the invention in addition to use as an intermediate as above indicated is useful as an end product. It can be cast into desired shapes as it comes from the reduction furnace, e.g., bricks for construction, or it may be chilled as it leaves the furnace to shatter the glass into bits, for example, by pouring the molten glass into water, or subsequently ground to produce, in either instance, particulate glass for insulation and the like. The glass is especially suitable for the production of blown or cellular glass by known methods, e.g., as described in U.S. Patent 1,912,017 or 1,967,375 and improvements thereof.

The iron formed is, lower in sulfur, phosphorus, and silicon than that conventionally produced in a blast furnace. The iron may be directly cast into suitable shapes and its cooling rate controlled to impart properties thereto which are comparable to conventional cast iron and high-carbon steel. The metal, as cast, is easy to machine. If desired, as stated hereinbefore, alloying metals may be admixed with the charge to impart desirable properties to the resulting iron. For example, chromium or nickel metal, alloys, or reducible ores may be admixed to impart corrosion resistance.

The method of the invention may be practiced batchwise wherein the iron and silica materials, carbonaceous material, and additional non-reducible oxides, if any, are added to a reaction vessel, the vessel and contents heated, and the products recovered. Alternatively, the mode of operation may be semi-continuous or continuous wherein the reaction mixture is prepared and conveyed as on a conveyor means through a heating zone while the mixture is being moved to a melting furnace in which completion of the reaction and fusion occurs.

The practice of the invention is preferably carried on continuously. A mode of continuous practice which is especially satisfactory consists of employing a pelletizing apparatus which forms a moist mixture of the charge into suitable size pellets and discharges them onto a travelling grate which conveys the pellets through a heating zone, preferably supplied with an air or oxygen gas flow, to the reaction vessel and discharges the pellets into the reaction vessel from which air is substantially excluded. The temperature of the pellets on the grate is usually maintained between about 400° and below the melting point of reactants or reaction products, which is usually below 1000° C. The effect on the grate is to dry the pellets, bring the temperature close to the reduction temperature to be employed in the reaction vessel or the furnace, and reduce much or even all of the oxidic iron source material to FeO and Fe, while solid.

The pelletizing and conveyor system may be operated as a feed means for a number of reaction vessels or convertor type furnaces.

The particle size of the materials charged to the furnace is not highly critical, pulverized material ranging from less than 325 mesh U.S. Standard Sieve up to coarse material the size of baseballs being acceptable. However, a particle size of less than 20 mesh is preferred. The charge materials may be premixed but usually are added separately for convenience. Highly intimate intermixing of the ingredients is unnecessary but light mixing for up to a minute or so is usually preferred.

The actual reduction to molten metal may be carried out in a conventional type furnace consisting of a pot or reaction vessel positioned in a heating chamber which is usually either gas-fired or electrically heated or in an internally electrically heated convertor-type reduction vessel or furnace. It is recommended that the pot or reaction vessel be made of graphite or be a graphite-lined high-melting metal or alloy. Vessels of plumbago or Tercod are satisfactory as well as those of high density graphite. Graphite lined high melting point steels, molybdenum, or tantalum also are quite satisfactory for melting pot construction.

It is preferred that a loosely fitted cover, or a cover having a vent therein for the escape of evolved gases, particularly oxides of carbon, be placed over the reaction vessel to retain therein a blanket of such gases over the surface of the reacting mixture to exclude air. The reaction gases produced provide sufficient blanketing to exclude air or oxygen but, if desired, a blanket of nitrogen, argon, or helium may also be provided especially for protecting the outside of graphite or carbon vessels, if used.

It is to be understood that oxygen gas or air plays no part in the practice of the invention, and is not required for the chemical reactions. On the other hand, although its exclusion is recommended, its presence is not detrimental aside from an uneconomical waste of carbon and possible damage to the reaction vessel when graphite is employed.

The pot or reaction vessel preferred is one which is elongated vertically and may consist of a cylindrical upper part and a removable lower part or receptacle detachably engaged to the upper part for ready attachment and removal, as by mating threaded portions.

The molten glass and iron produced may be tapped and separated by properly located drain means on the reaction vessel during entrance of the feed. Preferably, the grate will be stopped or the feed directed to another reaction vessel just prior to draining off molten glass and metal. For example, a convertor type furnace may be provided with a tipping means. The molten products thereafter separately solidify.

Alternatively, the charge can be poured into a suitable container, preferably of graphite, and allowed to cool therein. The stratified reaction products, while cooling, contract to some extent, thereby drawing away from the walls of the reaction vessel and may be removed by inserting a suitable tool, e.g., a hook or rod into the space thus formed between the edge of the metal and the inside wall of the reaction vessel. The layers separate readily, when tapped, into a glass portion and an iron metal portion (except when LiOH or $Li_2O$ is employed as explained hereinafter).

If metal having physical properties attained by slow cooling is desired, the molten metal may be transferred for example directly into a mold and the mold embedded in a temperature-control medium. Alternatively, the molten metal may be transferred to an intermediate vessel serving as a mold and allowed to assume a solid shape therein. The so-formed metal while still at red heat, thereafter is transferred to a temperature-control medium, e.g., a bed of lime, and cooled slowly.

The following examples will serve to further illustrate the present invention.

EXAMPLES 1 to 9

In these examples hematite, carbon, and sodium hydroxide were used as the reactants, each being described below.

The hematite ore was obtained from the Mesabi Range of Minnesota. The ore contained 61 percent Fe and 2.76 percent silica by weight. There was present a lesser percent of P, S, Mn, Ca, Mg, Mn, and Al (these latter materials being present as impurities normally found in such ore). There were also present some water and organic material which were removed by heating.

The carbon source was a high percent fixed carbon product known as Norite having a nominal composition of 98 percent carbon and about 2 percent silica.

Sodium hydroxide was in flake form. It consisted of about 98.5 percent NaOH and about 1.5 percent $Na_2CO_3$ and may be considered generally as being 100 percent reactive.

For Examples 1 to 9, 500 grams of the ore was crushed with carbon to a size of less than 10 mesh (U.S. Standard Sieve Series) and the NaOH was admixed therewith in the mole ratios of C to $F_2O_3$ and of NaOH (calculated as $Na_2O$) to $SiO_2$ respectively set out in Table I below. The silica in the Norite was included in calculating the amount of NaOH required.

Table I

| Example No. | Mole Ratios | |
|---|---|---|
| | $C:Fe_2O_3$ | $Na_2O:SiO_2$ |
| 1 | 3 | 1 |
| 2 | 3 | 0.5 |
| 3 | 3 | 1.5 |
| 4 | 1.5 | 1 |
| 5 | 1.5 | 0.5 |
| 6 | 1.5 | 1.5 |
| 7 | 4.5 | 1 |
| 8 | 4.5 | 0.5 |
| 9 | 4.5 | 1.5 |

A reactor charge for each of Examples 1 to 9 was placed in the reaction vessel of an electrically heated reduction furnace.

The reactor was brought up to temperature, varying in the different examples between 1454° and 1482° C. and held at that temperature for an average time of about 40 minutes and then cooled. The receptacle was then removed, cooled and the reaction products, consisting of an upper layer of solid glass and a lower layer of solid metallic iron product, were removed by means of a thin metal rod provided with a hook at the lower end. The two layers readily were separated by light tapping.

The glass-like slag produced by Examples 1 to 6 was clear, hard and brittle, of high vitreous luster and of limited translucency. It was of a color varying from light green to olive green. The glass-like slag produced in Examples 7 to 9, wherein a higher ratio of carbon to $Fe_2O_3$ was employed, generally was similar in properties to that of Examples 1 to 6 except that it was cloudy and had a dark brown cast.

The iron produced had a high metallic luster and was machinable and heat treatable. By heat treating the metal, different desirable physical properties, e.g., varying degrees of malleability and hardness were imparted to the metal. For example, some of the metal having a Brinell hardness number of 91 was cut, the cut surface polished and etched, and micrographs of the etched surface were taken. The micrographs indicated that the metal was similar in nature to pearlitic malleable iron.

Chemical analyses were run on the glass product and iron product formed in each of Examples 1 to 9. The results of these analyses are presented in Table II.

Table II

| Example Number | Elements Present in Iron Product Weight Percent | | | | | Elements Present in Glass Product Weight Percent | | | | | | | | | |
|---|---|---|---|---|---|---|---|---|---|---|---|---|---|---|---|
| | C | P | S | Si | Mn | Na | Mg | Al | Si | P | S | Ca | Ti | Mn | Fe |
| 1 | 4.71 | .12 | .005 | .04 | .50 | 25.16 | .37 | 8.01 | 21.67 | 0 | .38 | .43 | .39 | 2.40 | .44 |
| 2 | 4.35 | .13 | .001 | .06 | .49 | 18.77 | .38 | 9.12 | 22.59 | 0 | .33 | .71 | .47 | 3.10 | .73 |
| 3 | 4.52 | .08 | .003 | .02 | .50 | 27.64 | .16 | 7.78 | 19.09 | .26 | .51 | .57 | .39 | 3.10 | .51 |
| 4 | 4.76 | .12 | .007 | .02 | .53 | 22.68 | .16 | 8.68 | 22.56 | 0 | .47 | .71 | .34 | 2.01 | .50 |
| 5 | 5.02 | .10 | .009 | .02 | .30 | 20.51 | .14 | 7.43 | 23.17 | 0 | .28 | .61 | .29 | 3.24 | .18 |
| 6 | 4.36 | .08 | .003 | .02 | .26 | 30.27 | .14 | 6.54 | 19.26 | 0 | .51 | .49 | .37 | 2.66 | .89 |
| 7 | 4.75 | .11 | .010 | .08 | .38 | 19.07 | .28 | 8.44 | 23.67 | 0 | .36 | .68 | .35 | 1.98 | .64 |
| 8 | 4.67 | .13 | .015 | .15 | .45 | 15.50 | .34 | 9.55 | 20.78 | 0 | .38 | .82 | .38 | 1.99 | .64 |
| 9 | 4.84 | .12 | .008 | .10 | .43 | 22.41 | .29 | 2.59 | 23.83 | 0 | .31 | .84 | .44 | .93 | .68 |

An evaluation of the results of Table II shows that the glass produced by the practice of the invention is vastly different from the slag obtained from conventional practice. In the glass produced by the invention, sodium, as $Na_2O$, is present in an amount by weight in most examples in excess of ⅓ the total weight of the glass and $SiO_2$ is present in a similar percent by weight to that of $Na_2O$. The amount of CaO present is extremely small. The $Al_2O_3$ in the glass produced in the examples comprised from about 7 to 9 percent by weight of the glass. The amount of the oxides of manganese runs over 3 percent in a number of examples. The high sodium, aluminum, and manganese values and low calcium values are highly desirable for certain glasses, especially for container glass.

The glass made according to the invention is particularly desirable as an additament in conventional glass making. The normal form of such oxides as $Al_2O_3$ is difficult to incorporate into a conventional glass melt whereas the alumina of the instant glass product readily is dissolved in the melt at the temperatures employed in the glass making furnace, e.g., 1100° to 1300° C. The calcium silicate slag produced in conventional iron-ore reduction has no significant use in the art of glass-making.

EXAMPLE 10

The same procedure and materials were used as in Examples 1 to 9 except that taconite was employed instead of hematite ore. The taconite contained 35.2 percent Fe and 39.0 percent by weight $SiO_2$ and impurities within the range set forth herein. 500 grams of pulverized taconite was placed in the reactor. Sufficient pulverized Norite to give a carbon to $Fe_2O_3$ mole ratio of 3 and sufficient flake NaOH to give a mole ratio of $Na_2O$ to $SiO_2$ of 1.5 was admixed therewith. The charge was heated to 1438° C. and held at that temperature for 50 minutes. It was then cooled and the resulting stratified solid glass and iron products removed and separated as in Examples 1 to 9.

*Table III*

| Example Number | Elements Present in Iron Product (Weight Percent) | | | | | Elements Present in Glass Product (Weight Percent) | | | | | |
|---|---|---|---|---|---|---|---|---|---|---|---|
| | C | P | S | Si | Mn | Na | Mg | Si | Ti | Mn | Fe |
| 10 | 4.73 | .05 | .003 | .03 | .17 | 26.65 | .15 | 23.09 | .06 | .66 | 3.53 |

The glass was clear and olive green in color. The metal showed substantially the same physical properties as produced from the hematite ore in Examples 1 to 9.

Chemical analyses of the resulting iron and glass-like slag are presented in Table III.

EXAMPLE 11

Using the same procedure as set forth in Example 10, boiler furnace slag was used as the iron-silica source instead of taconite. The slag produced was the fused ash of soft coal burned in the furnace of an industrial steam-generating plant. The slag while hot was run from beneath the furnaces on a travelling grate and then dumped into cold water. This resulted in the slag being shattered into bits having an average size of about ¼ to ½ inch. The shattered slag then was carried by a flow of water to a storage pile and drained dry. It contained by weight 15.32 percent Fe, 43.30 percent $SiO_2$, about 24 percent $Al_2O_3$ and as minor impurities Mn (0.06%), Mg (0.9%), Ca (4.8%), Ti (0.96%), K (0.1%) and substantially no phosphorus or sulfur.

A mixture of about 729.1 grams of the boiler furnace slag (containing 111.7 grams of iron and 315.6 grams of $SiO_2$), 36.01 grams of Norite and 420.6 grams of flake NaOH was placed in the reaction vessel in a reduction furnace. This mixture had a mole ratio of $C/Fe_2O_3$ of about 3 and an equivalent mole ratio of $Na_2O/SiO_2$ of about 1. The charge thus prepared was heated over a range of from about 1349° to about 1393° C. for 40 minutes, thereby reducing the charge to a molten glass layer superimposed on a molten metallic iron layer. The reactor and contents were cooled to solidify the glass and iron layers. These were then removed from the furnace and separated.

The weight of iron obtained was 110.2 grams. The glass was pale green in color.

Both the metal and glass produced were of similar quality to that produced from hematite ore in Examples 1 to 6.

EXAMPLE 12

Five hundred grams of the same hematite ore as was employed in Examples 1 to 9 was admixed in a reaction vessel with 112.81 grams of Norite ($C/Fe_2O_3$ mole ratio of about 3.4) and 27.74 grams of $Na_2CO_3$ (soda ash), (equivalent to a $Na_2O/SiO_2$ mole ratio of about 1). This mixture was heated at 1504° C. for 50 minutes. The reaction vessel and contents were then cooled and the contents, consisting of a solidified layer of glass on a solidified layer of metallic iron, removed.

The metal produced was of similar quality to that produced in the above examples. The glass was cloudy and of a dark brown color, but had the general physical properties of the glass-like slag obtained in Examples 1 to 9.

Chemical analyses were run on both the glass and iron produced. The results of these analyses are set out in Table IV.

EXAMPLE 13

This example was run in substantially the same manner as Example 1 except that LiOH was employed instead of NaOH. The metal and glass were substantially the same as that produced in Example 1 except that Li appeared

*Table IV*

| Example Number | Elements present in iron product (weight percent) | | | | | Elements present in the glass (weight percent) | | | | | | | | | |
|---|---|---|---|---|---|---|---|---|---|---|---|---|---|---|---|
| | C | P | S | Si | Mn | Na | Mg | Al | Si | P | S | Ca | Ti | Mn | Fe |
| 12 | 4.41 | .11 | .021 | .09 | .35 | 17.04 | .25 | 8.93 | 23.77 | 0 | .46 | 2.65 | .10 | 1.44 | 2.55 | in place of Na in the analysis and there was a firm bond formed between the solidified layers of glass and metal which could not be broken without fracturing the glass. Such bond has utility where an iron metal and glass are desired to be so secured, e.g., in certain types of insulated conductors. If no such bond is desired when LiOH is employed, the molten glass may be poured off from the molten metal or the molten metal may be drained away before cooling.

EXAMPLE 14

Example 13 was repeated except KOH was employed instead of LiOH. The resulting glass and metal showed little difference from that produced in Example 1 except that K appeared in the analysis in place of Na. There was no bond formed between the cooled glass-like slag and iron as in the case of LiOH.

EXAMPLE 15

It was found that CaO in amounts up to about 25% of the weight of $Na_2O$ can be added to the NaOH employed in Examples 1 to 9 when practicing the procedure of the invention. Considerably reduced volatility of the alkali metal hydroxide was found when this CaO addition was made. With CaO addition beyond 25% (equivalent $Na_2O$ weight) the slag product assumed an increasingly mottled appearance and lack of glass-like characteristics.

EXAMPLE 16

A charge of about 1000 grams of ferrous silicate, (nominally expressed as FeO·SiO₂) which is comparable in composition to the oxidic ferrous iron-silica slags discharged from blast furnaces in the conventional methods of iron production, was admixed thoroughly with about 461 grams of flake sodium hydroxide and about 66.5 grams of Norite Coal. This charge contained an equivalent $C/Fe_2O_3$ mole ratio of about 1.6 and an equivalent $Na_2O/SiO_2$ mole ratio of about 0.77.

The reaction mixture was placed in a plumbago crucible and heated in a gas fired furnace. The mix temperature was maintained above about 1450° C. for about 40 minutes. The crucible then was removed from the furnace, and the molten product was poured into a graphite mold where it separated into a metallic iron phase and a lighter glass-like slag. The products solidified upon cooling and readily were separated by a light tapping.

The metal billet weighed about 387 grams, was well-formed and easily machined by standard practices. The metal was ductile as evidenced by the curled machine turnings produced by the lathe tool bit. Results from a standard spark test indicated the ferrous based metal had a carbon content in the range of that found in steels.

The glass formed weighed about 846 grams and was aqua-blue to sea-green in color and had high transparency.

Although the invention has been illustrated more particularly with reference to conventional iron ores and iron bearing slags, it is apparent that it may be applied as well to beneficiated iron ores and concentrates containing only nominal amounts of metal values impurities. An example of a useful iron ore concentrate from an ore of high Mg and Ca content is one having the following analysis, when dry, in percent by weight:

| | |
|---|---|
| Fe | 60.04 |
| $SiO_2$ | 7.42 |
| P | .02 |
| S | .02 |
| CaO | 1.50 |
| MgO | 1.48 |
| $Al_2O_3$ | .45 |
| $TiO_2$ | .04 |
| Mn | .71 |
| Loss on ignition | 1.48 |

Balance undetermined.

Various modifications can be made in the present invention without departing from the spirit or scope thereof for it is understood that we limit ourselves only as defined in the appended claims.

We claim:
1. The method of producing low sulfur, heat-treatable metallic iron and a vitreous homogeneous glass-like slag of fused oxides of an alkali metal and of silicon, said slag being substantially free from iron oxide, which consists of reacting at least at a temperature at which said iron and said slag are molten and admixture of an iron containing material selected from the group consisting of iron ores, siliceous and ferriferous cherts and shale, coal ash, fly ash and furnace slag having at least 3½ percent by weight of iron in a reducible form and at least 2 percent by weight of silicon dioxide, a carbonaceous material containing fixed carbon, and an alkali metal compound selected from the class consisting of alkali metal oxides, hydroxides, and carbonates, the mole ratio of the fixed carbon to iron being sufficient to reduce substantially all of the iron in the iron containing material and the mole ratio of the alkali metal compound, expressed as sodium oxide, to silicon dioxide being from about 0.25 to about 4, continuing the reaction until the iron containing material is substantially all reduced to a layer of molten metallic iron and a layer of molten glass-like slag and thereafter effecting a separation of said molten iron layer from the glass-like slag.

2. The method of claim 1 wherein the reduction temperature is from about 1250° to about 1500° C.

3. The method of claim 1 wherein the alkali metal compound is NaOH.

4. The method of claim 1 wherein the alkali metal compound is $Na_2CO_3$.

5. The method of claim 1 wherein the alkali metal compound is KOH.

6. The method of claim 1 wherein the alkali metal compound is LiOH

7. The method of claim 1 wherein the carbon to $Fe_2O_3$ mole ratio is from about 1.5 to about 3.

8. The method of claim 1, wherein the mole ratio of the alkali metal compound, expressed as sodium oxide, to $SiO_2$ is between 0.5 and 1.5 moles of the alkali metal oxide per mole of $SiO_2$.

9. The method of claim 1 and including the step of employing a mixture of alkali metal hydroxides and carbonates as the alkali metal oxide source, the amounts of said alkali metal hydroxide and carbonate in said mixture providing a mole ratio of alkali metal compound, expressed as sodium oxide, to silicon dioxide from about 0.25 to about 4.

10. The method of claim 1 wherein a calcium compound selected from the class consisting of $CaCO_3$, $Ca(OH)_2$ and CaO is added to said admixture in an amount which is less than 25% by weight of the alkali metal compounds employed.

11. The method of claim 1 wherein the source material containing oxides of iron and of silicon also contains oxides of aluminum.

12. The method of reducing oxides of iron contained in siliceous aluminous materials selected from the class consisting of iron ore, ferriferous chert, boiler furnace slag, and fly ash, to produce low sulfur, low phosphorous, low silicon, heat-treatable metallic iron and a homogeneous clear lightly colored glass-like slag, and said glass-like slag comprises fused oxides of sodium, silicon, and aluminum which consists of placing in the heating chamber of a reduction furnace a mixture consisting of pulverized siliceous aluminous material, coal, and sodium hydroxide in a mole ratio of fixed carbon in said coal of between 1.5 and 3.0 moles per mole of $Fe_2O_3$ and a mole ratio of sodium hydroxide, expressed as $Na_2O$, to $SiO_2$ of between 0.5 to 1.5 moles per mole of $SiO_2$, heating the mixture substantially in the absence of air at a temperature whereby the mixture stratifies into a lower stratum of molten metallic iron containing metals reducible by carbon in the presence of $Na_2O$ and an upper stratum of said molten glass-like slag comprising fused $Na_2O$, $SiO_2$, $Al_2O_3$ and oxides of other metals present in the mixture which are not reducible by carbon at the heat of reaction.

13. The method of claim 12 in which sodium carbonate replaces sodium hydroxide.

14. The method of claim 12 wherein said siliceous aluminous materials contain at least 5 percent by weight $Al_2O_3$.

15. The method of claim 12 wherein said siliceous aluminous materials contain sufficient alumina to provide about 2 moles of $Al_2O_3$ per mole of $SiO_2$ in the glass produced.

16. The method of claim 12 wherein metals, which have oxides reducible at the temperature of the reaction and which form useful alloys with iron, selected from the class consisting of nickel, chromium, and manganese are added to said admixture prior to heating.

References Cited in the file of this patent

UNITED STATES PATENTS

| | | |
|---|---|---|
| 1,106,407 | Rossi | Aug. 11, 1914 |
| 1,319,061 | Garred | Oct. 21, 1919 |
| 1,508,211 | Becket | Sept. 9, 1924 |
| 1,717,160 | Kichline | June 11, 1929 |
| 2,217,808 | Nye | Oct. 15, 1940 |
| 2,395,029 | Baily | Feb. 19, 1946 |
| 2,450,343 | Howard et al. | Sept. 28, 1948 |
| 2,727,815 | Kjellman | Dec. 20, 1955 |
| 2,815,272 | Armant et al. | Dec. 3, 1957 |
| 2,990,267 | Grebe et al. | June 27, 1961 |